US008637173B2

United States Patent
Koh

(10) Patent No.: US 8,637,173 B2
(45) Date of Patent: Jan. 28, 2014

(54) BATTERY PACK

(75) Inventor: Seok Koh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 245 days.

(21) Appl. No.: 13/219,442

(22) Filed: Aug. 26, 2011

(65) Prior Publication Data

US 2012/0214023 A1  Aug. 23, 2012

Related U.S. Application Data

(60) Provisional application No. 61/445,009, filed on Feb. 21, 2011.

(51) Int. Cl.
| | |
|---|---|
| *H01M 14/00* | (2006.01) |
| *H01M 6/00* | (2006.01) |
| *H01M 8/00* | (2006.01) |
| *H01M 10/00* | (2006.01) |
| *H01M 2/36* | (2006.01) |
| *H01M 2/26* | (2006.01) |
| *H01M 2/28* | (2006.01) |
| *H01M 2/00* | (2006.01) |
| *H01M 2/02* | (2006.01) |
| *H01M 2/04* | (2006.01) |

(52) U.S. Cl.
USPC .......... 429/7; 429/48; 429/95; 429/121; 429/122; 429/163; 429/168; 429/169; 429/170; 429/176

(58) Field of Classification Search
USPC .......... 427/7, 95, 48, 121, 122; 429/7, 95, 48, 429/121, 122, 163, 176, 170, 169, 168
See application file for complete search history.

(56) References Cited

U.S. PATENT DOCUMENTS

| | | | | |
|---|---|---|---|---|
| 6,319,630 | B1 * | 11/2001 | Hasegawa et al. | 429/162 |
| 6,518,731 | B2 * | 2/2003 | Thomas et al. | 320/136 |
| 2008/0081254 | A1 | 4/2008 | Kim et al. | |
| 2008/0261109 | A1 * | 10/2008 | Shieh | 429/176 |
| 2009/0081539 | A1 | 3/2009 | Koh et al. | |
| 2009/0111018 | A1 * | 4/2009 | Park et al. | 429/179 |
| 2010/0048257 | A1 * | 2/2010 | Prest et al. | 455/575.1 |

FOREIGN PATENT DOCUMENTS

| | | |
|---|---|---|
| JP | 2001-093497 | 4/2001 |
| JP | 2002-124233 | 4/2002 |
| JP | 2007131342 | * 3/2007 |

(Continued)

OTHER PUBLICATIONS

Hawley's Condensed Chemical Dictionary 14th ed. 2002 John Wiley & Sons {http://www.knovel.com/web/portal/browse/display?_EXT_KNOVEL_DISPLAY_bookid=704&VerticalID=0}.*
Machine English Translation of JP 2002-124233, 6 pages.
KIPO Notice of Allowance dated May 27, 2013, for corresponding Korean Patent application 10-2011-0095639, (5 pages).

(Continued)

*Primary Examiner* — Patrick Ryan
*Assistant Examiner* — Aaron Greso
(74) *Attorney, Agent, or Firm* — Christie, Parker & Hale, LLP

(57) ABSTRACT

Disclosed is a battery pack including guide recesses inside a case. The battery pack includes a core pack including a bare cell, and a protective circuit member electrically connected to the bare cell, a case accommodating the core pack, and an upper cover covering the core pack. The case includes a base plate, reinforcement plates vertically extending from edges of the base plate, and a resin part surrounding the reinforcement plates. A guide recess is disposed inside the resin part.

12 Claims, 7 Drawing Sheets

(56) References Cited

FOREIGN PATENT DOCUMENTS

| KR | 10-2007-0071252 |   | 7/2007 |
|----|-----------------|---|--------|
| KR | 20070112490     | * | 11/2007 |
| KR | 10-2008-002987 A |  | 4/2008 |

OTHER PUBLICATIONS

Patent Abstracts of Japan, and English machine translation of Japanese Publication 2001-093497, dated Apr. 6, 2001, listed above, (11 pages).

* cited by examiner

BATTERY PACK

CROSS-REFERENCE TO RELATED APPLICATIONS

This application claims the benefit of U.S. Provisional Application No. 61/445,009, filed on Feb. 21, 2011, in the United States Patent and Trademark Office, the entire disclosure of which is incorporated herein by reference.

BACKGROUND

1. Field

Embodiments relate to a battery pack.

2. Description of the Related Art

Lithium polymer batteries may be fabricated in the form of a thin flexible pouch. Such a pouch-type battery includes an electrode assembly in a pouch, wherein the electrode assembly is formed by stacking, or stacking and winding a positive electrode, a separator, and a negative electrode. A heat welding process is performed on edges of upper and lower pouch films to form the pouch. The pouch includes a multi-layered film of a typical metal foil layer and a synthetic resin layer covering the metal foil layer. The metal foil layer may be formed of aluminum.

The metal foil layer is susceptible to external shock. Thus, a case surrounding the pouch may be helpful. A label surrounds the case.

The case may be an injection-molded part with a plate formed on a surface through insert molding. In this case, ribs are on the outer portion of the case to fix the plate. The ribs form recesses in the outer portion of the case removed from a mold. The recesses form an uneven surface on the outer portion of the case, which may damage the label.

SUMMARY

An aspect of the present invention provides a battery pack including guide recesses inside a case to protect a label surrounding the case from damage due to an uneven surface.

Another aspect of the present invention provides a battery pack including a reinforcement plate bent at least one time to improve the strength of a case against external shock or bending.

Another aspect of the present invention provides a battery pack including resin passing through a through hole of a reinforcement plate to improve the coupling force of a plate and a resin part.

According to one embodiment, a battery pack is provided including a bare cell; and a case accommodating the bare cell, wherein the case includes a resin frame generally encompassing the bare cell; wherein the resin frame comprises a plurality of side walls, wherein each side wall has an exterior-facing surface comprising resin and an interior-facing surface having a plurality of resin recesses; and a reinforcement frame coupled to the resin frame between the exterior-facing surface and the interior-facing surface, wherein a portion of the reinforcement frame is exposed through the resin recesses.

In one embodiment, the reinforcement frame comprises a base plate and a plurality of side walls, and wherein each of the side walls is folded onto itself to form a double-wall. Further, the reinforcement frame may have a plurality of openings, and wherein the resin frame protrudes through the openings. In one embodiment, the openings are on the side walls of the reinforcement frame and at least a portion of the base plate of the reinforcement frame is exposed through the resin frame.

In one embodiment, the resin frame further includes a plurality of resin feet that extend along a portion of the base plate of the reinforcement frame. Further, the battery pack may also include a cover, wherein the resin frame has a cover recess that extends around the resin frame and is configured to accommodate the cover therein, and a protective circuit, wherein the resin frame has a terminal hole through which a portion of the protective circuit passes.

In one embodiment, the exterior-facing surface of the resin frame is seamless. Additionally, the battery pack may include a label on the exterior-facing surface of the resin frame.

According to the embodiments, since the guide recesses are located inside the case, the label surrounding the case is protected from damage due to an uneven surface, thereby improving the appearance of the battery pack.

Further, according to the embodiments, since the reinforcement plate is bent at least one time, the strength of the case against external shock or bending is improved. Additionally, since resin passes through the through hole of the reinforcement plate, the coupling force of the plate and the resin part is improved.

DETAILED DESCRIPTION

Hereinafter, embodiments will be described in detail with reference to the accompanying drawings.

Figure 1A:
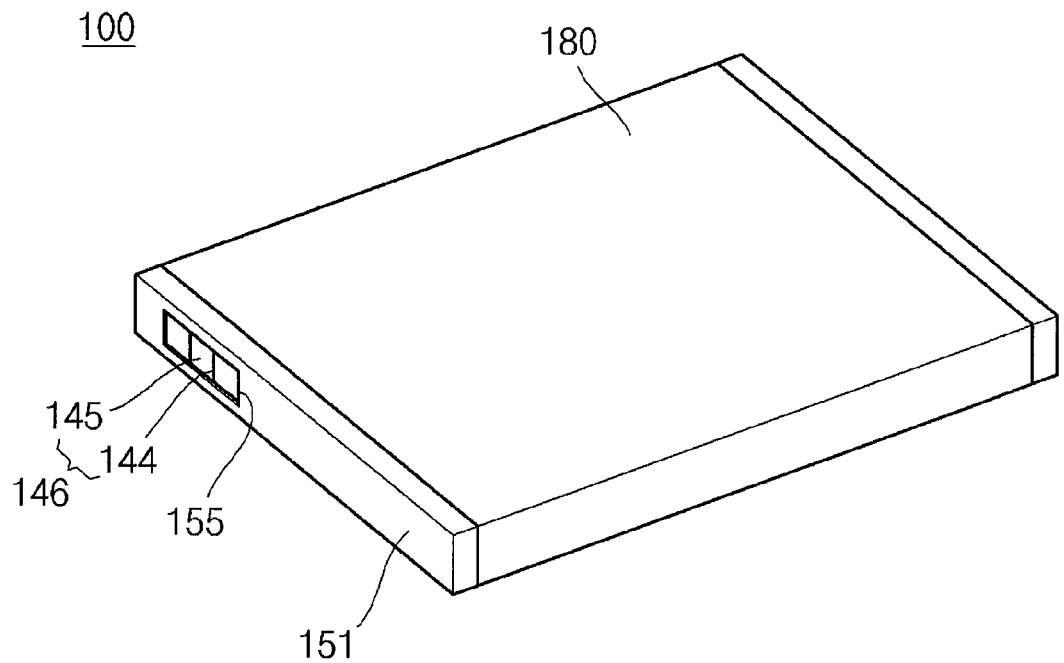
FIG. 1A is a perspective view illustrating a battery pack according to an embodiment.
Figure 1B:
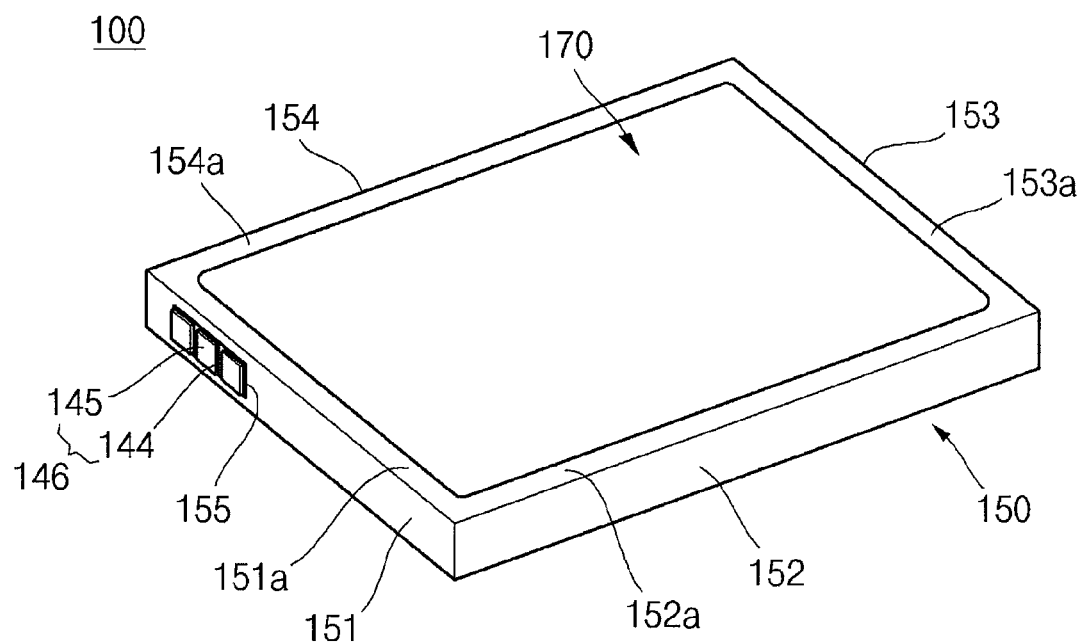
FIG. 1B is a perspective view illustrating the battery pack of FIG. 1A without a label.
Figure 2:
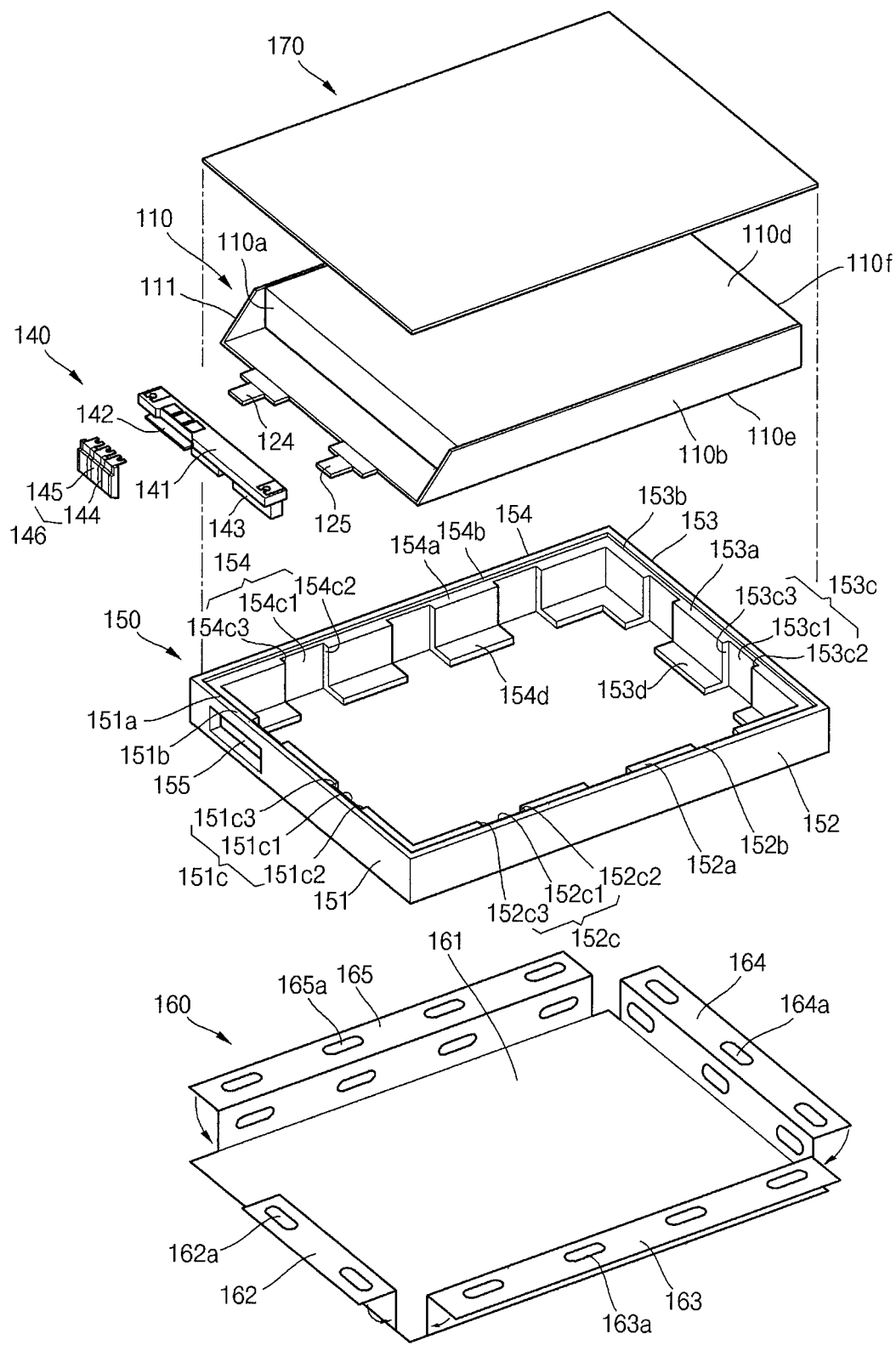
FIG. 2 is an exploded perspective view illustrating the battery pack of FIG. 1B.
Figure 3:
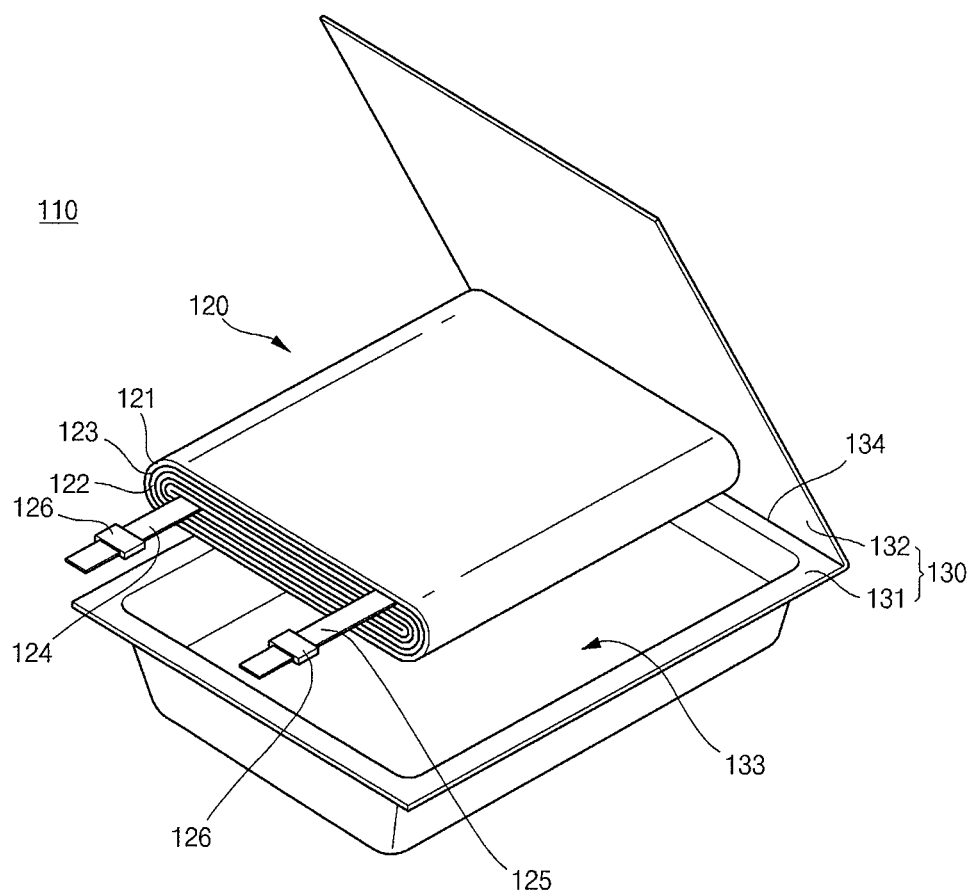
FIG. 3 is an exploded perspective view illustrating a bare cell of FIG. 2.
Figure 4:
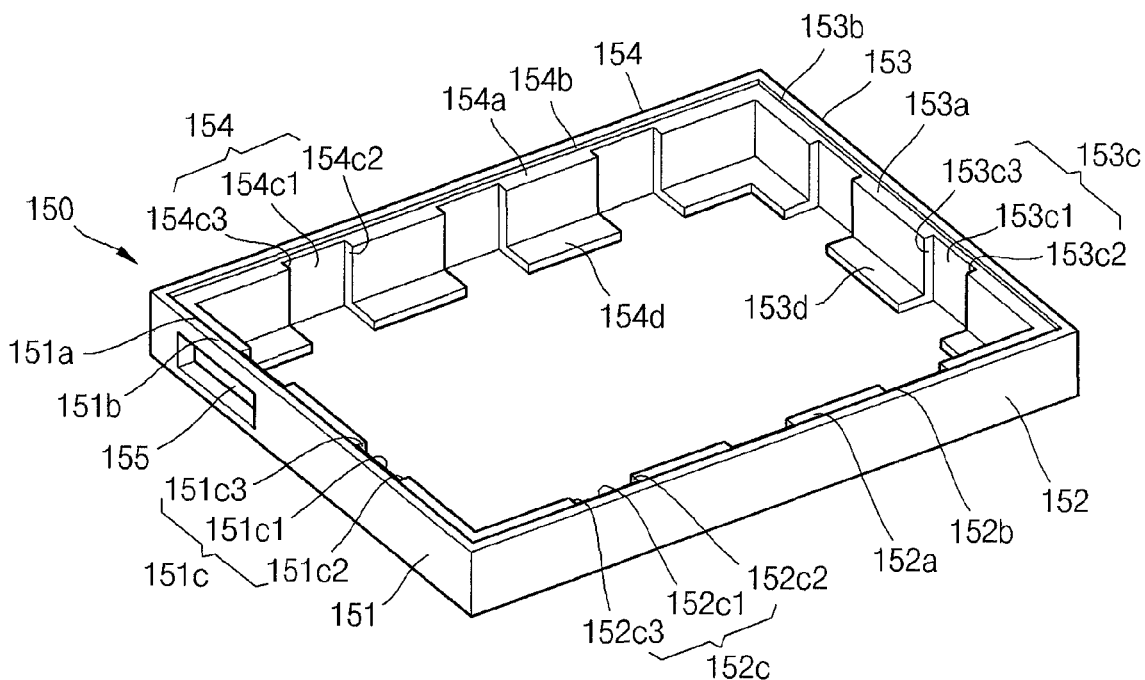
FIG. 4 is a perspective view illustrating a resin part of a case of FIG. 2.
Figure 5:
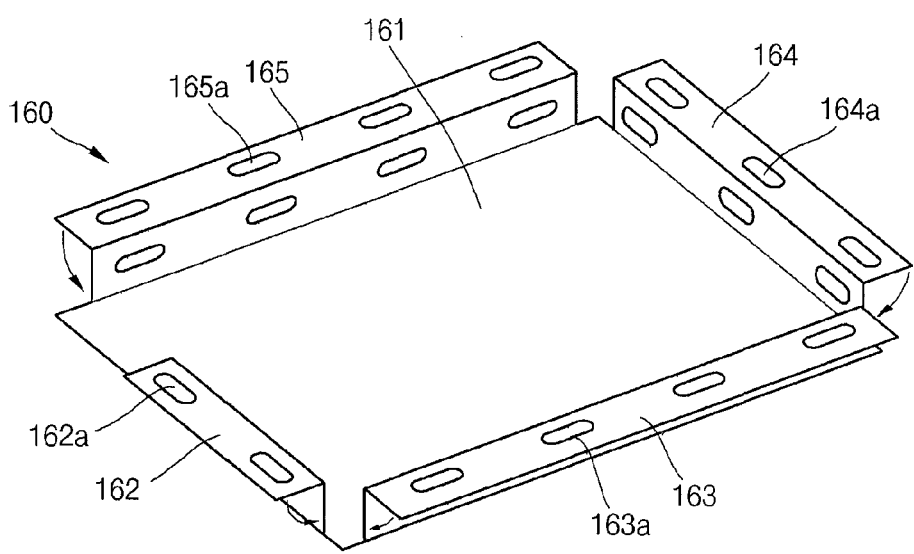
FIG. 5 is a perspective view illustrating reinforcement plates bent from a plate of FIG. 2.
Figure 6:
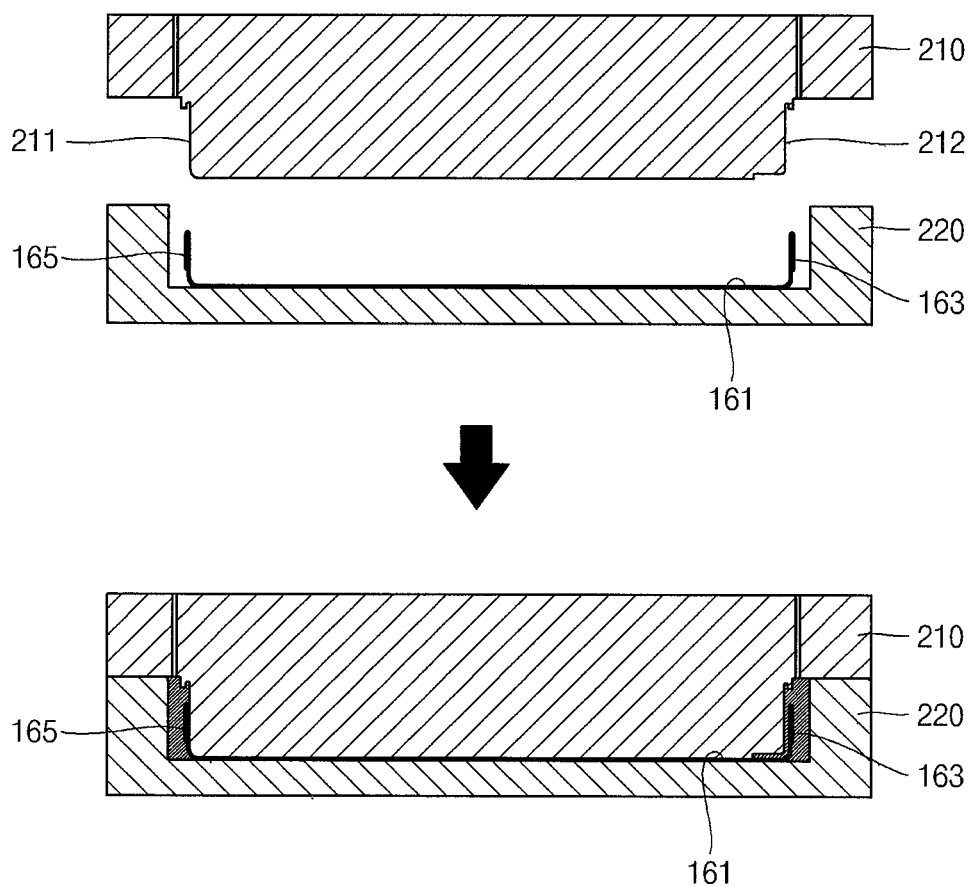
FIG. 6 is a cross-sectional view illustrating a case that is formed through insert molding on the plate of FIG. 5.
Figure 7:
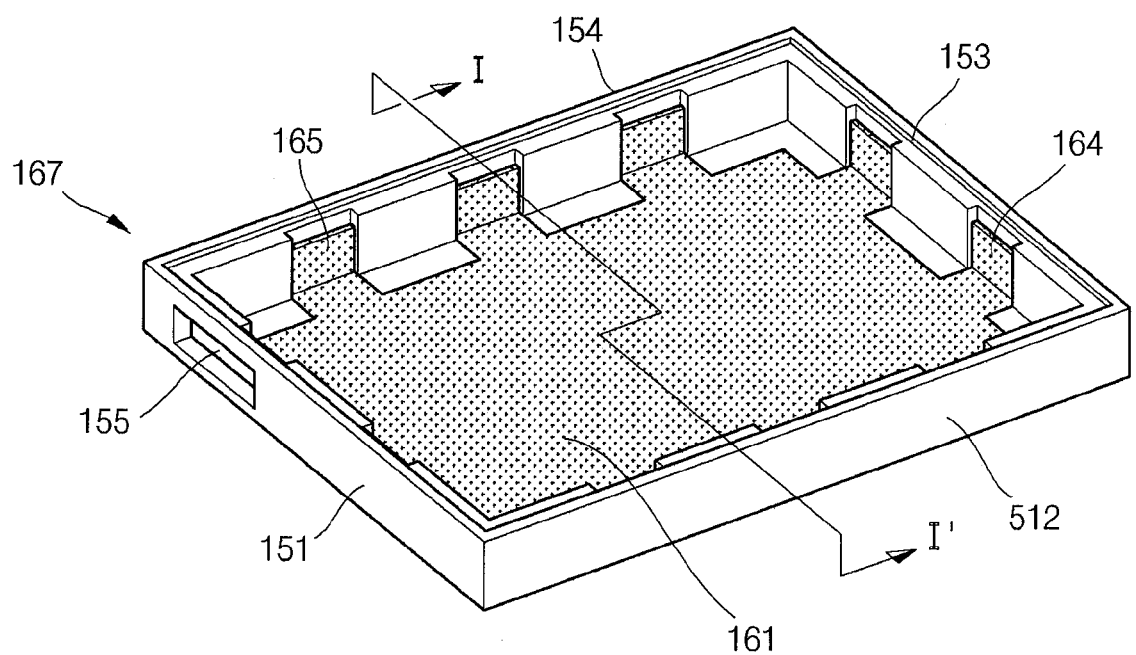
FIG. 7 is a perspective view illustrating the case of FIG. 6.
Figure 8:
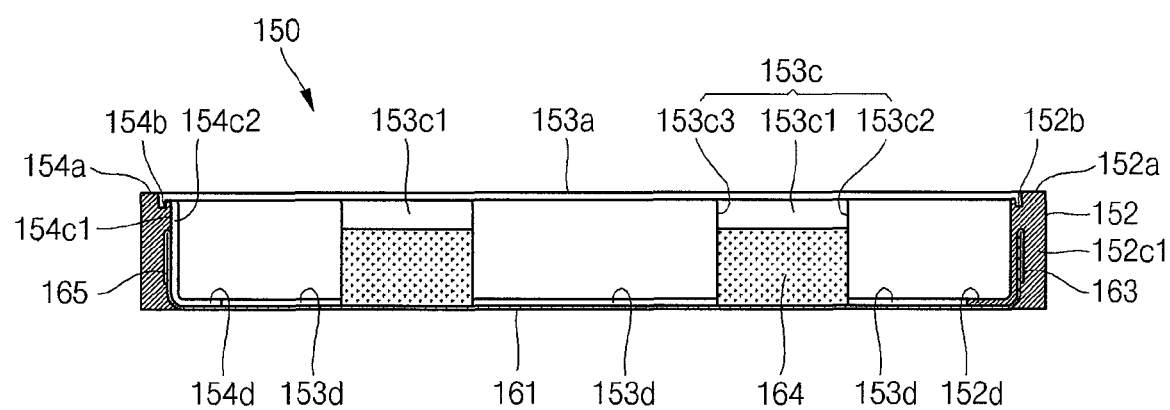
FIG. 8 is a cross-sectional view taken along line I-I' of FIG. 7.

FIG. 1A is a perspective view illustrating a battery pack according to an embodiment. FIG. 1B is a perspective view illustrating the battery pack of FIG. 1A without a label. FIG. 2 is an exploded perspective view illustrating the battery pack of FIG. 1B. FIG. 3 is an exploded perspective view illustrating a bare cell of FIG. 2. FIG. 4 is a perspective view illustrating a resin part of a case of FIG. 2. FIG. 5 is a perspective view illustrating reinforcement plates bent from a plate of FIG. 2. FIG. 6 is a cross-sectional view illustrating a case that is formed through insert molding on the plate of FIG. 5. FIG. 7 is a perspective view illustrating the case of FIG. 6. FIG. 8 is a cross-sectional view taken along line I-I' of FIG. 7.

Referring to FIGS. 1 through 8, a battery pack 100 according to an embodiment includes a bare cell 110, a protective circuit member 140, a case 167, an upper cover 170, and a label 180.

The case 167 of the battery pack 100 accommodates the bare cell 110 and the protective circuit member 140. The upper cover 170 covers the bare cell 110. The case 167 includes a reinforcement plate 160 and a resin frame 150 that is an injection-molded part formed of resin through the insert molding. In this case, the case 167 includes guide recesses in the resin frame 150.

Since the guide recesses are located in the resin frame 150, the reinforcement plate 160 can be easily inserted into a mold 220. Since the resin frame 150 does not damage the label 180 on the exterior of the battery pack 100, the appearance of the battery pack 100 is improved.

The bare cell 110 includes an electrode assembly 120, a positive electrode tab 124, a negative electrode tab 125, insulation tapes 126, and an exterior member 130.

The electrode assembly 120 may be formed by sequentially stacking or winding a positive electrode plate 121, a separator 123, and a negative electrode plate 122. The positive electrode tab 124 functioning as a positive electrode protruding from a non-coating portion of the positive electrode plate 121 is attached to the positive electrode plate 121 and the negative electrode tab 125 functioning as a negative electrode protruding from a non-coating portion of the negative electrode plate 122 is attached to the negative electrode plate 122.

The positive electrode plate 121 may be formed by coating aluminum foil or mesh with a lithium cobalt oxide. The negative electrode plate 122 may be formed by binding graphite to copper foil. The separator 123 may be formed of gel-type polymer electrolyte. However, the material of the separator 123 is not limited to gel-type polymer electrolyte, but rather may be any suitable material.

The positive electrode tab 124 may be connected to the aluminum foil. The negative electrode tab 125 may be formed by connecting a nickel tab to the copper foil. However, the present invention is not limited to the above described materials. The positive electrode tab 124 and the negative electrode tab 125 include the insulation tapes 126. The insulation tapes 126 insulate the positive electrode tab 124 and the negative electrode tab 125 from the exterior member 130 to be described later.

The exterior member 130 includes a multi-layered structure, and specifically a front case 131 and a rear case 132, which are separated by a folding line 134.

The exterior member 130 includes a metal thin film and insulation layers formed on both side portions of the metal thin film and electrically insulated. The metal thin film may be formed of one of steel, stainless steel, aluminum, and an equivalent thereof. However, the material of the metal thin film is not limited thereto.

A press process is performed on the front case 131 to form an accommodation part 133 that accommodates the electrode assembly 120. The accommodation part 133 has a shape corresponding to the shape of the electrode assembly 120. The accommodation part 133 includes a pouch surface having a length that is substantially equal to the depth of the accommodation part 133. The positive electrode tab 124 and the negative electrode tab 125 extend out of the accommodation part 133.

The bare cell 110 is formed by inserting the electrode assembly 120 into the accommodation part 133, covering the front case 131 with the rear case 132, and sealing edges of the accommodation part 133 by heat welding.

The protective circuit member 140 includes a protective circuit module 141 and a terminal part 146.

The protective circuit module 141, which is a protective circuit device configured to control charging and discharging of a battery, may be a printed circuit board (PCB) on which a certain line pattern is printed. The line pattern may be located on a surface of the protective circuit module 141 or in the protective circuit module 141. The protective circuit module 141 is electrically connected to the positive electrode tab 124 and the negative electrode tab 125 through connection terminals 142 and 143. The positive electrode tab 124 and the negative electrode tab 125 are bent in an L or U shape so that the protective circuit member 140 can easily stand at a front surface 110a of the bare cell 110. The protective circuit member 140 may be placed on an upper portion 111 of the bare cell 110. The protective circuit member 140 standing at the front surface 110a has a height that is equal to or smaller than the height of a side part 110b.

The terminal part 146 includes metal parts 144 and a housing 145 surrounding the metal parts 144. The metal parts 144 are formed of a conductive material so that a current can flow between the protective circuit module 141 and an external device. The housing 145 is formed of an insulation material such as plastic to insulate the metal parts 144 that are spaced a constant distance from one another in the housing 145. An insulation sheet may be located between the protective circuit module 141 and the bare cell 110 to prevent an unnecessary short circuit.

An assembly of the protective circuit member 140 and the bare cell 110 is called a core pack.

The case 167 includes the resin frame 150 and the reinforcement plate 160. The case 167 has an approximately rectangular parallelepiped shape with an open surface. The case 167 is formed by performing an insert molding process on the reinforcement plate 160. In the insert molding process, a reinforcement member such as a metal plate or film is put in a mold, and then resin is supplied therein to form an injection-molded part. The case 167 protects the core pack from an external shock.

The resin frame 150 is formed by placing the reinforcement plate 160 in molds 210 and 220 and supplying resin therein.

The molds 210 and 220 may be designated as upper and lower molds, respectively. The upper mold 210 includes protrusion parts 211 to fix the reinforcement plate 160 and a resin injection hole. Resin introduction parts 212 are located between the protrusion parts 211 and fix the reinforcement plate 160 within the lower mold 220.

After the lower mold 220 is covered with the upper mold 210, resin is introduced between the upper mold 210 and the lower mold 220 through the injection hole. Since the protrusion parts 211 contact reinforcement plates 162, 163, 164, and 165 to be described later, the resin cannot be introduced therebetween. However, the resin introduction parts 212 form certain spaces with the reinforcement plates 162, 163, 164, and 165 to receive the resin. The protrusion parts 211 and the resin introduction parts 212 are alternately arrayed on each of the reinforcement plates 162, 163, 164, and 165. In this case, the alternating number of the protrusion parts 211 and the resin introduction parts 212 is not limited. After the introduced resin is dried, the case 167 is taken out from the upper mold 210 and the lower mold 220.

Hereinafter, the resin formed through the insert molding on the case 167 is referred to as the resin frame 150.

The resin frame 150 includes first to fourth resin parts or side walls 151, 152, 153, and 154 to correspond to outer surfaces of the bare cell 110. The resin frame 150 includes guide recesses to receive the bare cell 110. The guide recesses are located at positions corresponding to the protrusion parts 211 of the upper mold 210 to fix the reinforcement plate 160. The guide recesses are formed after the insert molding. Hereinafter, the guide recesses are referred to as resin recesses 151c, 152c, 153c, and 154c.

The first resin part 151 includes a first upper resin part 151a, a cover receiving recess 151b, one or more first resin recesses 151c, and a terminal hole 155. The first resin part 151 corresponds to the front surface 110a of the bare cell 110. The protective circuit member 140 is formed, on the front surface 110a of the bare cell 110. The first resin part 151 includes the terminal hole 155 through which the terminal part 146 of the protective circuit member 140 passes.

The first resin part 151 includes the first upper resin part 151a corresponding to the upper cover 170 to be described later. The first upper resin part 151a includes the cover receiving recess 151b on which the upper cover 170 is placed. The cover receiving recess 151b may be lower than the first upper resin part 151a by the thickness of the upper cover 170.

The first resin part 151 includes first inner resin parts corresponding to the protrusion parts 211 and the resin introduction parts 212 of the upper mold 210. The first inner resin parts include at least one of the first resin recesses 151c. The present invention is not limited to the width of the first resin recesses 151c in FIGS. 2, 4, 7 and 8. The first resin recess 151c is formed by a first surface 151c1 forming a part thinner than the first upper resin part 151a; and second and third surfaces 151c2 and 151c3 extending from both sides of the first surface 151c1 and corresponding to the thickness of the first upper resin part 151a. The first resin part 151 includes first lower resin parts extending from the second and third surfaces 151c2 and 151c3. The first lower resin parts are located at both sides of the first resin recess 151c and generally correspond to an edge of a lower surface 110e of the bare cell 110.

The second resin part 152 includes a second upper resin part 152a, a cover receiving recess 152b, and the second resin recess 152c. The second resin part 152 corresponds to the side part 110b of the bare cell 110 and includes the second upper resin part 152a corresponding to the upper cover 170 to be described later. The second upper resin part 152a includes the cover receiving recess 152b on which the upper cover 170 is placed. At least one of the second resin recesses 152c is located inside the second resin part 152. The second resin recess 152c is formed by a first surface 152c1 forming a part thinner than the second upper resin part 152a; and second and third surfaces 152c2 and 152c3 extending from the first surface 152c1 and corresponding to the thickness of the second upper resin part 152a. The second resin part 152 includes second lower resin parts 152d extending from the second and third surfaces 152c2 and 152c3.

The third resin part 153 includes a third upper resin part 153a, a cover receiving recess 153b, and the third resin recess 153c. The third resin part 153 corresponds to a lower surface 110f of the bare cell 110 and includes the third upper resin part 153a corresponding to the upper cover 170. The third upper resin part 153a includes the cover receiving recess 153b on which the upper cover 170 is placed. At least one of the third resin recesses 153c is located inside the third resin part 153. The third resin recess 153c is formed by a first surface 153c1 forming a part thinner than the second upper resin part 153a; and second and third surfaces 153c2 and 153c3 extending from the first surface 153c1 and corresponding to the thickness of the third upper resin part 153a. The third resin part 153 includes third lower resin parts 153d extending from the second and third surfaces 153c2 and 153c3.

The fourth resin part 154 includes a fourth upper resin part 154a, a cover receiving recess 154b, and the fourth resin recesses 154c. The fourth resin part 154 corresponds to another side part of the bare cell 110 and includes the fourth upper resin part 154a corresponding to the upper cover 170. The fourth upper resin part 154a includes the cover receiving recess 154b on which the upper cover 170 is placed. The cover receiving recess 154b may be lower than the fourth upper resin part 154a by the thickness of the upper cover 170. At least one of the fourth resin recesses 154c is located inside the fourth resin part 154. The fourth resin recess 154c is formed by a first surface 154c1 forming a part thinner than the fourth upper resin part 154a; and second and third surfaces 154c2 and 154c3 extending from the first surface 154c1 and corresponding to the thickness of the fourth upper resin part 154a. The fourth resin part 154 includes fourth lower resin parts 154d extending from the second and third surfaces 154c2 and 154c3.

The present invention is not limited to the shapes or number of recesses shown in FIGS. 2, 4, 7 and 8.

The first to fourth reinforcement plates 162, 163, 164, and 165 to be described later are located in the middle of the first to fourth resin parts 151, 152, 153, and 154, respectively. Since the protrusion parts 211 of the upper mold 210 contact the first to fourth reinforcement plates 162, 163, 164, and 165 to prevent the introduction of resin, after the case 167 is removed from the upper mold 210 and the lower mold 220, the first to fourth reinforcement plates 162, 163, 164, and 165 are partially exposed through the first to fourth resin recesses 151c, 152c, 153c, and 154c within the first to fourth resin parts 151, 152, 153, and 154, as illustrated in FIG. 8.

The exterior of the lower portion of the case 167 where the first to fourth lower resin parts 151d, 152d, 153d, and 154d are coupled to a base plate 161 has a substantially uniform thickness through the insert molding. Thus, the label 180 surrounding the case 167 is protected from damage due to an uneven surface. The inner bottom surface of the case 167 where the first to fourth lower resin parts 151d, 152d, 153d, and 154d are coupled to the base plate 161 is substantially even through the insert molding to prevent damage of the bare cell 110.

Since the first to fourth resin recesses 151c, 152c, 153c, and 154c are located inside the resin frame 150, the upper mold 210 can securely fix the reinforcement plate 160. Since there is no recess or protrusion on the exterior of the resin frame 150, the label 180 surrounding the case 167 is protected from damage due to a recess or protrusion. In other words, an exterior-facing surface of the resin frame is seamless.

The reinforcement plate 160 includes the base plate 161 and the first to fourth reinforcement side walls 162, 163, 164, and 165. The reinforcement side wall 160 reinforces the case 167 and may be formed of a metal such as stainless steel, but the present invention is not limited thereto.

The base plate 161 corresponds to a surface of the bare cell 110 accommodated in the case 167.

The first to fourth reinforcement side walls 162, 163, 164, and 165 include one or more through holes 162a, 163a, 164a, and 165a. The first to fourth reinforcement side walls 162, 163, 164, and 165 vertically protrude from edges of the base plate 161, respectively. The first to fourth reinforcement side walls 162, 163, 164, and 165 are bent at least one time and may be formed such that at least two edges face each other, i.e., each reinforcement side wall may be folded onto itself.

At least one of the through holes 162a, 163a, 164a, and 165a is formed in the first to fourth reinforcement side walls 162, 163, 164, and 165 extending from the edges of the base plate 161. The resin passes through the through holes 162a, 163a, 164a, and 165a to improve the coupling force of the first to fourth reinforcement side walls 162, 163, 164, and 165 with the resin frame 150.

Referring to FIG. 5, the first to fourth reinforcement side walls 162, 163, 164, and 165 have a length that generally corresponds to the resin frame 150.

The first reinforcement side wall 162 extends from a first edge of the base plate 161 and is configured such that the terminal part 146 of the core pack can pass through the case 167.

The first reinforcement side wall 162 is bent vertically from the first edge of the base plate 161. Referring to FIG. 5, the first reinforcement side wall 162 can be bent at least one time according to a length extending from the base plate 161. The thickness of the first reinforcement side wall 162 may be about twice as greater as the thickness of the base plate 161. Thus, the more times the first reinforcement side wall 162 is bent, the greater the strength of the first reinforcement side wall 162 against external shock or bending.

The first reinforcement side wall 162 includes at least one of the through holes 162a. The resin passes through the through holes 162a during the insert molding to improve the coupling force of the resin frame 150 and the reinforcement side wall 160.

The second reinforcement side wall 163 extends from a second edge of the base plate 163. The second reinforcement side wall 163 can be bent at least one time and includes the through holes 163a. The length of the second reinforcement side wall 163 may be equal to or smaller than the length of the second edge of the base plate 161. Since the second reinforcement side wall 163 and the through holes 163a are the same in configuration and function as the first reinforcement side wall 162 and the through holes 162a, a description thereof will be omitted.

The third reinforcement side wall 164 extends from a third edge of the base plate 163. The third reinforcement side wall 164 can be bent at least one time and includes the through holes 164a. The length of the third reinforcement side wall 164 may be equal to or smaller than the length of the third edge of the base plate 161. Since the third reinforcement side wall 164 and the through holes 164a are the same in configuration and function as the first reinforcement side wall 162 and the through holes 162a, a description thereof will be omitted.

The fourth reinforcement side wall 165 extends from a fourth edge of the base plate 161. The fourth reinforcement side wall 165 can be bent at least one time and includes the through holes 165a. The length of the fourth reinforcement side wall 165 may be equal to or smaller than the length of the fourth edge of the base plate 161. Since the fourth reinforcement side wall 165 and the through holes 165a are the same in configuration and function as the first reinforcement side wall 162 and the through holes 162a, a description thereof will be omitted.

The upper cover 170 is placed on the upper portion of the case 167 to cover the core pack. The upper cover 170 may be formed of a metal such as stainless steel. The upper cover 170 is inserted and coupled to the cover receiving recesses 151b, 152b, 153b, and 154b of the case 167. The upper cover 170 may include a base cover and side parts extending from edges of the base cover. The side parts are inserted in the cover receiving recess 151b, 152b, 153b, and 154b.

When the upper cover 170 is coupled to the case 167, the upper cover 170 may be substantially flush with the case 167.

The label 180 surrounds the case 167 and the upper cover 170. The label 180 protects the battery pack 100 from the outside. The label 180 surrounding the case 167 and the upper cover 170 provide certain mechanical strength and surface stiffness to the battery pack 100. The case 167 has no protrusion or recess on the exterior thereof to protect the label 180 from damage due to a protrusion or recess, thereby improving the appearance of the battery pack 100.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

| DESCRIPTION OF THE SYMBOLS IN MAIN PORTIONS OF THE DRAWINGS | |
|---|---|
| 100: | battery pack |
| 110: | bare cell |
| 120: | electrode assembly |
| 121: | positive electrode plate |
| 122: | negative electrode plate |
| 123: | separator |
| 124: | positive electrode tab |
| 125: | negative electrode tab |
| 126: | insulation tape |
| 130: | exterior member |
| 131: | front case |
| 132: | rear case |
| 140: | protective circuit member |
| 141: | protective circuit module |
| 146: | terminal part |
| 150: | resin part |
| 151, 152, 153, 154: | first to fourth resin parts |
| 151c, 152c, 153c, 154c: | first to fourth resin recesses |
| 155: | terminal hole |
| 160: | plate |
| 161: | base plate |
| 162, 163, 164, 165: | first to fourth reinforcement plates |
| 162a, 163a, 164a, 165a: | through hole |
| 170: | upper cover |
| 180: | label |

What is claimed is:

1. A battery pack comprising:
a bare cell; and
a case accommodating the bare cell, wherein the case comprises:
   a resin frame generally encompassing the bare cell; wherein the resin frame comprises a plurality of side walls, wherein each side wall has an exterior-facing surface comprising resin and an interior-facing surface having a plurality of resin recesses; and
   a reinforcement frame coupled to the resin frame between the exterior-facing surface and the interior-facing surface, wherein a portion of the reinforcement frame is exposed at the resin recesses such that the reinforcement frame directly contacts the bare cell at the resin recesses.

2. The battery pack of claim 1, wherein the reinforcement frame comprises a base plate and a plurality of side walls, and wherein each of the side walls is folded onto itself to form a double-wall.

3. The battery pack of claim 2, wherein the reinforcement frame has a plurality of openings, and wherein the resin frame protrudes through the openings.

4. The battery pack of claim 3, wherein the openings are on the side walls of the reinforcement frame.

5. The battery pack of claim 2, wherein at least a portion of the base plate of the reinforcement frame is exposed through the resin frame.

6. The battery pack of claim 2, wherein the resin frame further comprises a plurality of resin feet that extend along a portion of the base plate of the reinforcement frame.

7. The battery pack of claim 1, wherein the reinforcement frame comprises metal.

8. The battery pack of claim 1, wherein the reinforcement frame comprises stainless steel.

9. The battery pack of claim 1, further comprising a cover, wherein the resin frame has a cover recess that extends around the resin frame and is configured to accommodate the cover therein.

10. The battery pack of claim 1, further comprising a protective circuit and wherein the resin frame has a terminal hole through which a portion of the protective circuit passes.

11. The battery pack of claim 1, wherein the exterior-facing surface of the resin frame is seamless.

12. The battery pack of claim 1, further comprising a label on the exterior-facing surface of the resin frame.

\* \* \* \* \*